RECORDING AND REPRODUCING APPARATUS

Filed Aug. 24, 1959 4 Sheets-Sheet 1

INVENTORS
FRED L. BAILEY,
JOHN P. JENKINS,
VERNON A. NOLTE
BY
Burns, Doane, Benedict & Irons
ATTORNEYS

RECORDING AND REPRODUCING APPARATUS

Filed Aug. 24, 1959 4 Sheets-Sheet 2

INVENTORS
FRED L. BAILEY,
JOHN P. JENKINS,
VERNON A. NOLTE
BY
Burns, Doane, Benedict & Irons
ATTORNEYS INVENTORS
FRED L. BAILEY,
JOHN P. JENKINS,
VERNON A. NOLTE
BY
Burns, Doane, Benedict & Irons
ATTORNEYS

RECORDING AND REPRODUCING APPARATUS

Filed Aug. 24, 1959 4 Sheets-Sheet 4

INVENTORS
FRED L. BAILEY,
JOHN P. JENKINS,
VERNON A. NOLTE

BY Burns, Doane, Benedict & Irons
ATTORNEYS 3,059,063
Patented Oct. 16, 1962

1

3,059,063
RECORDING AND REPRODUCING APPARATUS

Fred L. Bailey, Normal, John P. Jenkins, Towanda, and Vernon A. Nolte, Bloomington, Ill., assignors to Automatic Tape Control, Inc., Bloomington, Ill., a corporation of Delaware Filed Aug. 24, 1959, Ser. No. 835,514
15 Claims. (Cl. 179—100.2)

This application relates to recording and reproducing apparatus for electrical signals, and more particularly to apparatus for controlling the reproduction of programs for announcement and broadcasting purposes.

The apparatus of the invention will be described primarily in conjunction with radio program broadcasting, but it will be understood that it is capable of many other applications, for instance, in announcing recorded messages at air line terminals, and the like.

In recent years program operations at radio broadcast stations have experienced major changes. Many of such changes are in the area of production aids, such as the use of themes and sound effects in conjunction with programs, and in the increased use of production commercial announcements using music, multiple voices, dramatic effects and other such attention-getting devices.

Production aids of this type must be mechanically reproduced and historically the broadcast industry has employed the electrical transcription and the more recent magnetic tape for prerecording such aids for subsequent reproduction. The disc recording method requires a competent engineer for preparation of the initial record and has a generally low-quality frequency response. Moreover, its disadvantages include a relatively short life. On the other hand, magnetic tape has high quality and long life, but the conventional tape playback machine requires expenditure of a substantial amount of time and trouble in threading the tape through the machine to the proper position for reproduction. This problem becomes particularly acute during certain periods of the day when radio stations are required to play recorded commercial announcements in relatively close sequence.

Because of the superior quality and life of magnetic tapes, most radio stations have in the past devised systems for using it as expeditiously as possible. For instance, many stations have gone to the rather expensive extent of providing a number of tape reproduction machines so that a plurality of announcements can be threaded and cued in advance of their use. Other stations have taken time to record a series of announcements on the same tape in sequence, so that the tape can be threaded once and then run throughout the day without rethreading.

The excessive use of time of personnel and the expense of these prior alternatives can be avoided by use of the apparatus that is now to be described. The apparatus of the present invention employs a magnetic tape which is wound in endless form in a cartridge which is readily placed in playback or recording position in the appropriate equipment. In the present invention, the tape has two channels, one for the program information to be reproduced and the other for a control signal or tone which is recorded at the beginning of the program. The recording apparatus is designed to automatically record the control tone at the beginning of each portion of program material, and the reproducing apparatus, as well as the recording apparatus, is designed to stop the tape when the control signal is reached. Thereby, the tape is automatically in proper position for reproduction after each use, so that the cartridge containing the tape may be merely placed in position on a reproduction machine whenever the program material on that tape is to be broadcast.

With the apparatus of the present invention it is not necessary to have a plurality of tape machines nor to thread the magnetic tapes before reproduction. Further, the flexibility of the program operation is not impaired with this apparatus as it would be if commercial announcements were recorded sequentially on a single tape, but rather it is increased.

2

The apparatus of the invention will be more fully described in conjunction with the preferred embodiments thereof shown in the accompanying drawings.

Figures 1, 2:
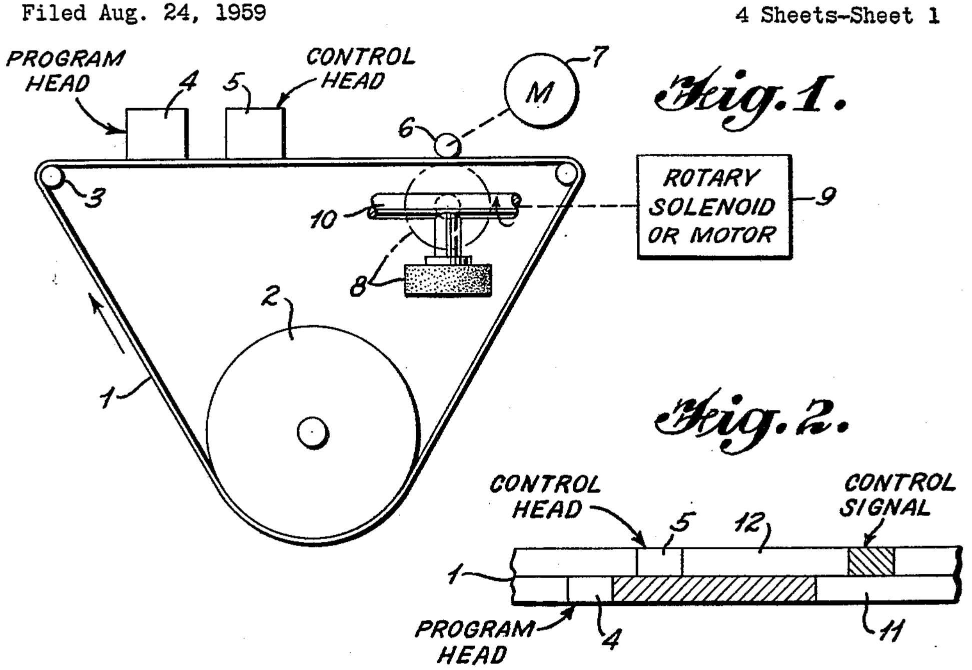
FIG. 1 is a schematic representation of some of the major portions of the apparatus showing their cooperative relationship.
FIG. 2 is a diagrammatic plan view of the two channels of the magnetic tape, showing the relationship between the control signal and the program signal on the tape.

Referring first to FIG. 1, the apparatus of the invention is designed for cooperation with a magnetic tape 1 wound in endless form on a reel 2 such that the tape is fed from the inner layer in the direction indicated by the arrow and is returned to the outer layer on the reel. The tape passes around a guide post 3 and past program and control heads 4 and 5 before returning to the reel.

The tape is driven by a drive capstan 6 which itself is rotated by an electrical motor 7, but normally the side of the tape opposite the drive capstan is free from restraint so that the rotation of the capstan is not effective to move the tape. When the tape is to be advanced, a pinch roll 8 is rotated into position opposite the drive roller through a rotary solenoid or motor 9 mechanically connected to a shaft 10 upon which the pinch roll is mounted. When the pinch roll is in operative position, the tape 1 is frictionally engaged with the capstan 6 and moves in the direction indicated by the arrow. Though the solenoid is described as rotary, it will be evident that a linear movement solenoid could be employed, and the linear movement changed into rotary movement of shaft 10 by conventional apparatus.

FIG. 2 shows a highly idealized expanded portion of the tape 1 and indicates that the tape is divided into channels 11 and 12. Channel 11 carries the program material recorded on the tape by the program head 4 as the tape is moved in the direction indicated. Channel 12 carries the control signal or tone which is recorded on the tape by control head 5 at the beginning of recording of the program. It will be seen that the program and control heads are not opposite each other, for convenience in manufacturing and mounting thereof, so that the control signal is advanced with respect to the program signal in the showing of FIG. 2. However, the leading edge of the control signal tone preferably corresponds very closely with the beginning of the program.

Figures 3, 6:
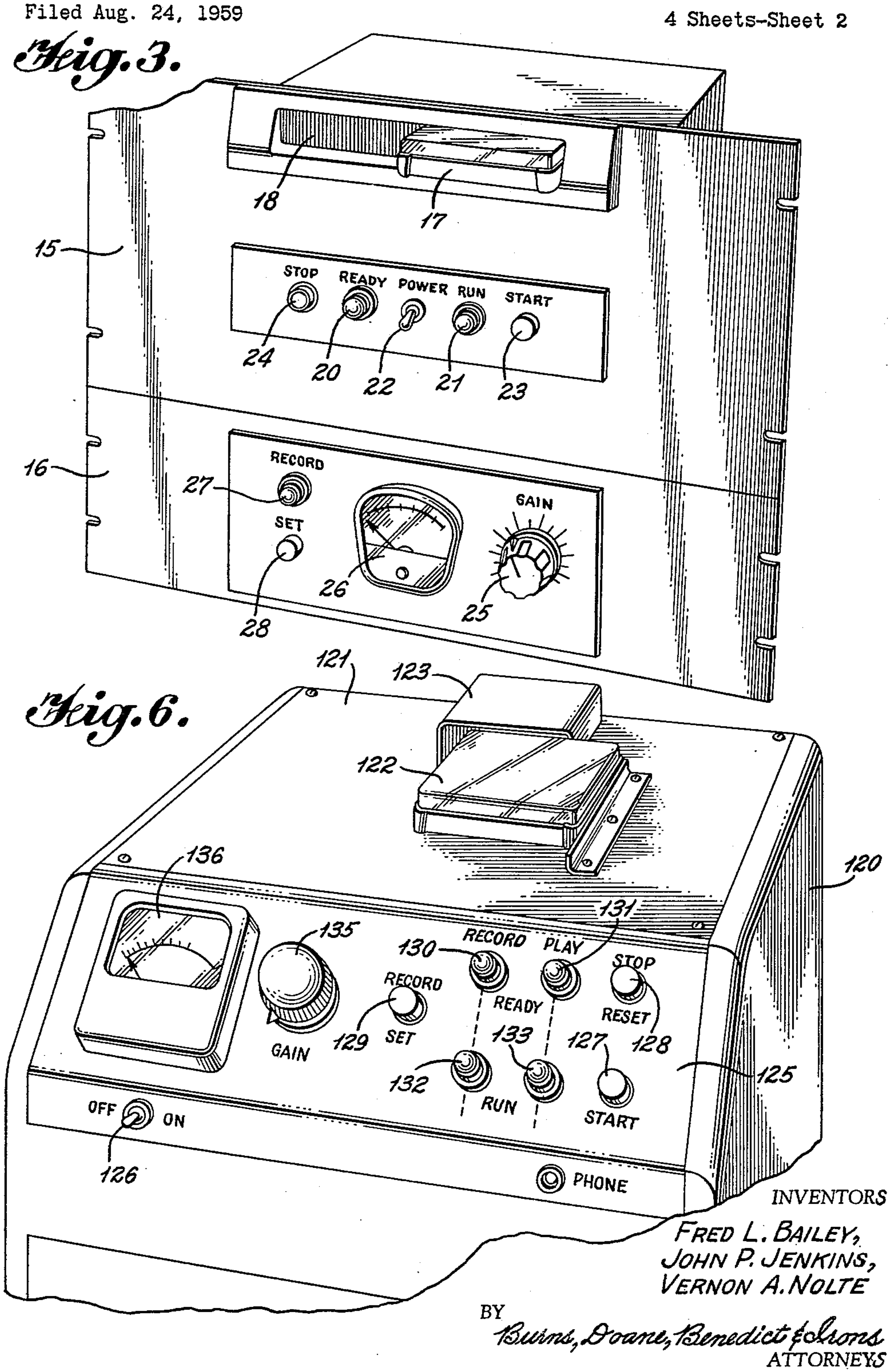
FIG. 3 is a perspective view of the front panel of a recording and reproducing apparatus constructed in accordance with the invention.
FIG. 6 is a perspective view of a different embodiment of the invention.

A commercial version of the apparatus of the invention is partially shown in FIG. 3 wherein the panel containing the playback and control elements is shown at 15 and the panel containing the recording elements is shown at 16. The tape is contained within a cartridge 17 positioned in a slot 18 at the upper end of the panel 15. The cartridge may be of the type disclosed in the patents to Eash, Nos. 2,778,635 through 2,778,637. The tape configuration in these cartridges is such that tape drive may be effected in only one direction. Should the tape be reversely driven, it will not be taken up from the capstan.

The upper panel 15 of the apparatus of FIG. 3 carries a pair of indicators 20 and 21 carrying the legends "Ready" and "Run," respectively. The usual power switch 22 is also provided, while a start switch 23 begins operation of the apparatus and a stop switch is provided to stop operation in case of emergency or improper functioning.

The recording panel 16 has the usual gain control 25 and VU meter 26, as well as a "Record" indicator 27 and a record "Set" switch 28.

Figure 4:
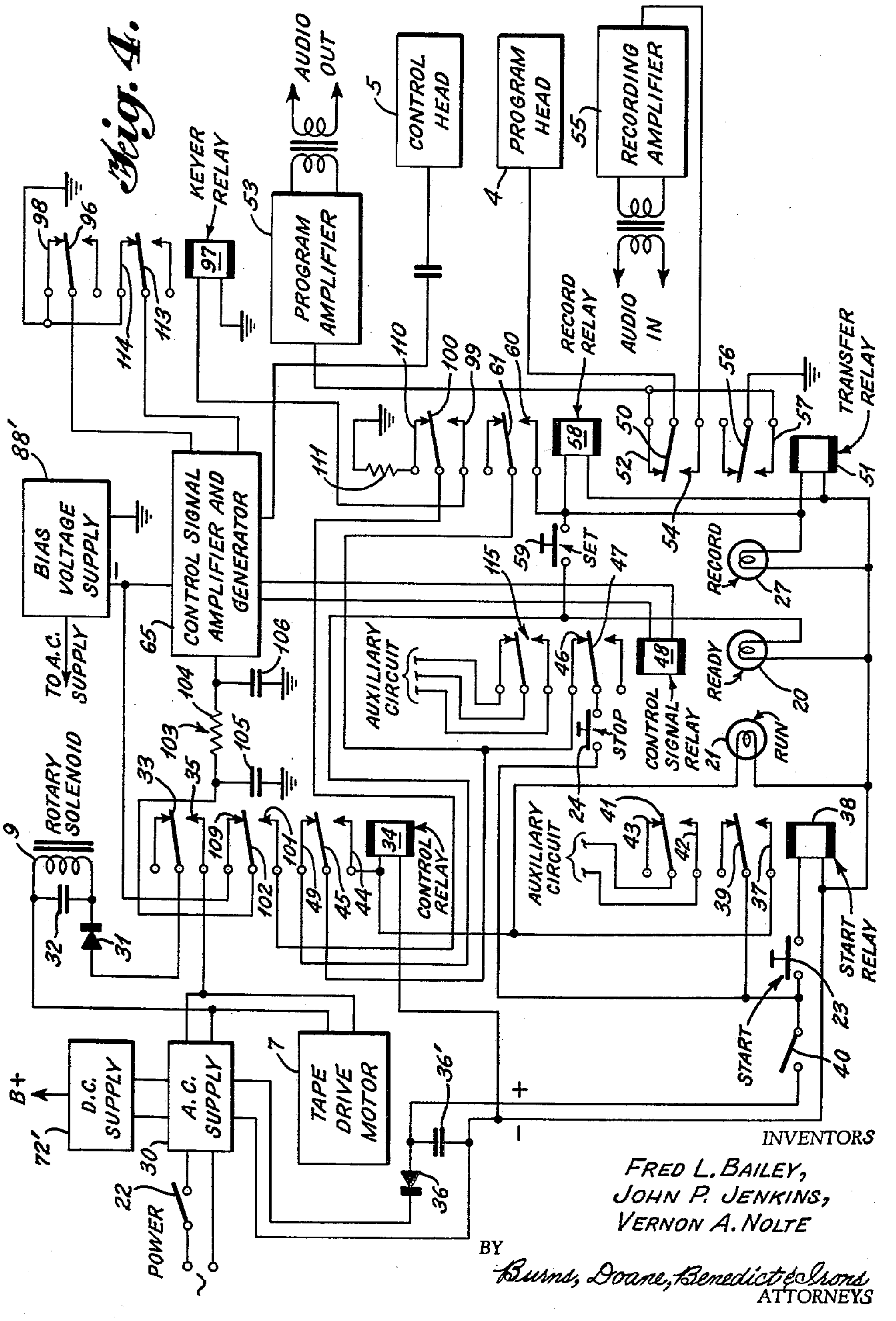
FIG. 4 is a schematic diagram of the electrical components of the apparatus of FIG. 3.

Referring now to FIG. 4, the apparatus contained within panels 15 and 16 includes a conventional alternating current supply 30 connectable through power switch 22 to a suitable source of A.C. voltage. The tape drive motor 7 is connected to the A.C. supply 30 so that, when the power switch is closed, the tape drive motor begins rotation to drive the capstan 6 of FIG. 1.

The rotary solenoid 9 has one side of its operating coil connected to the A.C. supply 30 and its other side connected through a diode rectifier 31 to movable contact 33 of a control relay 34. When the control relay is energized, the movable contact 33 engages normally open stationary contact 35 which is connected to the other side of the A.C. supply. A capacitor 32 is connected across the solenoid coil to smooth the rectified voltage supplied thereto. Thereby, when the control relay 34 is energized, the rotary solenoid is supplied with voltage so as to move the pinch roll 8 (FIG. 1) toward the tape 1 and engage the tape frictionally with the rotating drive capstan 6.

One side of the operating coil of control relay 34 is directly connected to the negative side of a D.C. voltage supply including diode rectifier 36 and filter capacitor 36′, connected to A.C. supply 30. The other side of the operating coil is connected to a stationary contact 37 of start relay 38. The corresponding movable contact 39 of the start relay is connected to the positive side of the D.C. supply through a single pole, single throw switch cartridge 40 which is designed to be closed when the cartridge 17 (FIG. 3) is in operative position. The start relay 38 has one side of its operating coil connected to the negative side of the D.C. supply and the other side connected through the normally open contacts of push button start switch 23 to movable contact 39. Thereby, when the start switch 23 is depressed, the start relay is energized to engage contacts 37 and 39 and energize control relay 34. When the control relay energizes, contacts 33 and 35 are engaged to operate the rotary solenoid and begin movement of the tape past program head 4 and control head 5.

The start relay 38 also has a movable contact 41 and a pair of cooperating stationary contacts 42 and 43 which, as indicated, may be connected to an auxiliary circuit to perform a control operation when the start switch 23 is depressed.

The control relay 34 has a holding circuit bypassing the contacts of the start relay, so that the control relay may remain energized to maintain tape movement after the start switch 23 is released. The holding circuit comprises stationary contact 44 and movable contact 45, which is connected through the normally closed contacts 46 and 47 of control signal relay 48 and the normally closed contacts of push-button Stop switch 24 to the cartridge switch 40. The function of the control signal relay will be described hereinafter. The stationary contact 44 of control relay 34 is connected to the positive side of the operating coil thereof, so that the holding circuit for the control relay is established when the relay operates and is maintained until the stop switch 24 is depressed or the control signal relay 48 is energized.

The Run indicator 21 has one of its sides connected to the negative side of the D.C. supply and the other side connected to holding contact 44 of the control relay. Thereby, the Run indicator is energized whenever the tape is being driven.

The "Ready" indicator 20 likewise has one of its sides connected to the negative terminal of the D.C. supply, while its other side is connected to stationary contact 49 of control relay 34. The stationary contact 49 is engaged by the movable contact 45, so that the "Ready" indicator is energized at the moment that the cartridge closes switch 40 and until tape drive is begun by energization of control relay 34.

The program head 4 is connected to a movable contact 50 of transfer relay 51. The cooperating normally-engaged stationary contact 52 of the relay is connected to the input of a conventional program amplifier 53 which provides an amplified audio output to any suitable equipment, such as a radio transmitter. The normally-disengaged stationary contact 54 is connected to the output of a conventional recording amplifier 55, which receives its input from any suitable audio source, as for instance a microphone. The recording amplifier preferably includes the usual high frequency bias oscillator conventionally employed for magnetic recording. Through these connections, when the transfer relay 51 is deenergized, the program head is connected directly to the program amplifier, for playback, while the recording amplifier 55 is unconnected. When the transfer relay is energized, the program head is connected to the output of the recording amplifier, while the input of the program amplifier 53 is grounded through movable contact 56 and stationary contact 57 of the transfer relay.

The operating coil of the transfer relay is connected directly across the operating coil of record relay 58. One side of the operating coil of the record relay is connected to the negative side of the D.C. supply, while the other side is connected through the record "Set" push button switch 28, contacts 49 and 45 of control relay 34, control signal relay contacts 46 and 47, "Stop" switch 24 and cartridge switch 40 to the positive side of the D.C. supply. Thereby, when a cartridge is placed in operative position and the record "Set" switch 28 is depressed, the record relay 58 and transfer relay 51 are energized to prepare the apparatus for recording the input of recording amplifier 55 on the magnetic tape 1. The record "Set" switch 28 is of the momentary contact push button type, so the record relay 58 is provided with a holding circuit including stationary contact 60 connected between the operating coil of the record relay and the record "Set" switch, and a movable contact 61 connected to the junction between stationary contact 46 of the control signal relay 48 and movable contact 45 of control relay 34. Thereby, when the record relay is energized, a holding circuit is established which maintains it energized until the stop switch is depressed or the control signal relay 48 is energized.

The "Record" indicator 27 indicates when the record relay is energized, since it is connected across the operating coil thereof.

The control head 5 is connected to one terminal of the control signal amplifier and generator 65, now to be described. In short, the amplifier and generator 65 supplies the control head with a tone signal when recording is begun, and receives from the control head a control signal at the end of the playback operation. The amplifier section of the control signal amplifier and generator is connected to the operating coil of the control signal relay 48 so as to provide energizing voltage therefor when the apparatus is in playback condition and the portion of the tape carrying the control signal passes control head 5. At that time, contacts 46 and 47 disengage to interrupt the circuits to the various relays and the rotary solenoid 9. The usual spring bias for the solenoid then returns the pinch roll 8 to retracted position and drive of the tape is halted.

The signal amplifier and generator 65 will now be described in conjunction with FIG. 5, as well as FIG. 4. First referring to FIG. 5, the circuit includes a triode vacuum tube 70 which has its cathode connected to ground through resistor 71 and its anode connected to a suitable source of positive voltage through plate resistor 72. The plate voltage may be obtained from a suitable D.C. supply 72' driven by A.C. supply 30. A grid return resistor 73 connects the grid of the triode to the ground, while the output from the plate resistor 72 is coupled through capacitor 74 to the grid of a second triode 75. The grid of the second triode is provided with the conventional grid return resistor 76 and with the usual cathode bias combination of resistor 77 and capacitor 78. The plate of triode 75 is connected to the positive side of the plate supply through plate resistor 79 and the voltage developed across that resistor is coupled to the grid of a third triode 80 through a capacitor 81. The cathode of triode 80 is biased by the parallel combination of resistor 82 and capacitor 83, while the plate is connected to the positive side of the plate supply through resistor 84.

The voltage across resistor 84 is connected to the grid of a relay tube 85 through coupling capacitor 86 in series with diode 87. The cathode of tube 85 is connected to ground while the grid is negatively biased through a voltage divider potentiometer 88 connected between the negative side of a suitable source of bias voltage supply 88' and ground. Bias voltage supply 88' may be powered from A.C. supply 30. The movable contact of potentiometer 88 is connected to the control grid of triode relay tube 85 through series resistor 89, and the grid is bypassed to ground by A.C. bypass capacitor 90.

As will now be explained, the circuit identified by numeral 65 functions alternatively as a control signal generator to supply the control head 5 with a suitable frequency tone, or as a control signal amplifier to provide energizing voltage for control signal relay 48. Describing first the amplifier function, the cathode of the input triode 70 is connected to the control head 5, so that any signal picked up by the control head will be amplified by the circuits including tubes 75 and 80 and applied as a positive D.C. voltage to the control grid of relay tube 85. The bias on the control grid is such that, in the absence of a control signal, no substantial plate current flows through the tube, but when a control signal is received, the grid is raised above cut-off and the tube passes plate current. The plate of tube 85 is connected through the operating coil of control signal relay 48 to the positive side of the plate supply, so that the control signal relay is energized when the tube 85 is cut on.

Turning now to a description of the control signal generation function of the circuit 65, the control grid of input triode 70 is connected to the plate of triode 75 through a coupling capacitor 95. This circuit provides regenerative feedback from the tube 75 to the tube 70 such as to make the combination of these tubes and their circuits an oscillator, except when the control grid of tube 70 is grounded. The control grid is connected to a movable contact 96 (FIG. 4) on keyer relay 97, and, except when the keyer relay is energized, the movable contact engages a stationary contact 98 which is connected to ground. The keyer relay 97 has one of the terminals of its coil grounded and the other terminal connected to a stationary contact 99 on record relay 58. The corresponding movable contact 100 of the relay 58 is connected to a normally open stationary contact 101 on control relay 34. The corresponding movable contact 102 of the control relay is connected to a bias circuit 103 comprised of series resistor 104 and shunt capacitors 105 and 106. The series resistor is connected between movable contact 102 and the control grid of triode 80 (FIG. 5) through resistor 107.

When the control relay 34 is deenergized, the bias circuit is connected to the negative side of bias voltage supply 88' through engagement of movable contact 102 with stationary contact 109 of the control relay. The positive side of the bias voltage supply is grounded.

It will be seen therefore that, before the control relay is energized, the capacitors 105 and 106 will be charged up to bias voltage through the connection to the bias voltage supply 88'. When the control relay is energized, the movable contact 102 engages stationary contact 101 which in turn is connected to movable contact 100 of record relay 58. When the record relay is deenergized, the movable contact 100 engages stationary contact 110 which is connected through discharge resistor 111 to ground. If the record relay 58 is energized when the control relay 34 is energized, the contacts 99 and 100 on the record relay establish a circuit between the bias circuit 103 and keyer relay 97. The bias capacitors 105 and 106 then discharge through the operating coil of the keyer relay to energize the relay and interrupt the ground return circuit for the control grid of triode 70, provided by contacts 96 and 98. Therefore, when the record relay is energized and the control relay is operated, the circuits including tubes 70 and 75 function as a generator to provide the control head with a signal of appropriate frequency. The length of this signal of course is governed by the length of time that the keyer relay 97 is maintained energized and this time period is controlled by the magnitude of charge on capacitors 105 and 106. The R-C time constant may be set such as to record a short control tone on the control signal channel of the tape 1 each time that the keyer relay is energized.

As indicated above, the control signal is recorded at the beginning of a program on the record tape. At the end of the recorded control signal, the keyer relay has deenergized to ground the control grid of triode 70. The circuit 65 then functions as an amplifier for the control signal and, when the portion of the tape upon which the signal was recorded passes the control head, the relay tube 85 is turned on to stop tape drive and deenergize the various relays of the circuit. When the program which was recorded in conjunction with this control signal is to be reproduced, however, the control head will be within the region of the control signal. Unless suitable provision for preventing operation of the control signal relay is made, the control head will detect the control signal at the beginning of playback and immediately stop tape drive. This disabling operation at the beginning of playback is prevented by a circuit now to be described.

As indicated above, the control grid of triode 80 is connected to the bias circuit 103 which receives a charge before the control relay 34 is energized. When the start switch 23 is depressed for playback operation, the negative bias provided by the circuit 103 is supplied to the grid of the tube 80 so that the tube 80 is cut off. This bias is dissipated through engagement of contacts 101 and 102 of the control relay, since contact 101 is connected through resistor 111 to ground when the record relay is deenergized. Therefore, the bias on the grid of tube 80 leaks off through resistor 111, but the time constant is so chosen that the control signal on the tape has advanced past the control head by the time tube 80 is cut on.

The protection provided by the bias on the grid of the tube 80 is operative also to prevent operation of the control signal relay at the beginning of the recording operation. Additional protection is provided by the voltage divider including potentiometer 88, resistor 89, rectifier 87 and resistor 110. When the keyer relay contacts 113 and 114 are opened by energization of that relay at the beginning of the recording operation, the bias on tube 85 is increased to its maximum, while, when the relay is released, the contacts are closed to return the bias to a lower level such as to permit the tube to be turned on by detection of the control signal.

The control signal relay 48 may also be provided with a set of contacts 115, similar to those provided for start relay 38, to operate an auxiliary circuit at the time the control signal passes the control head after completion of a program.

Figure 5:
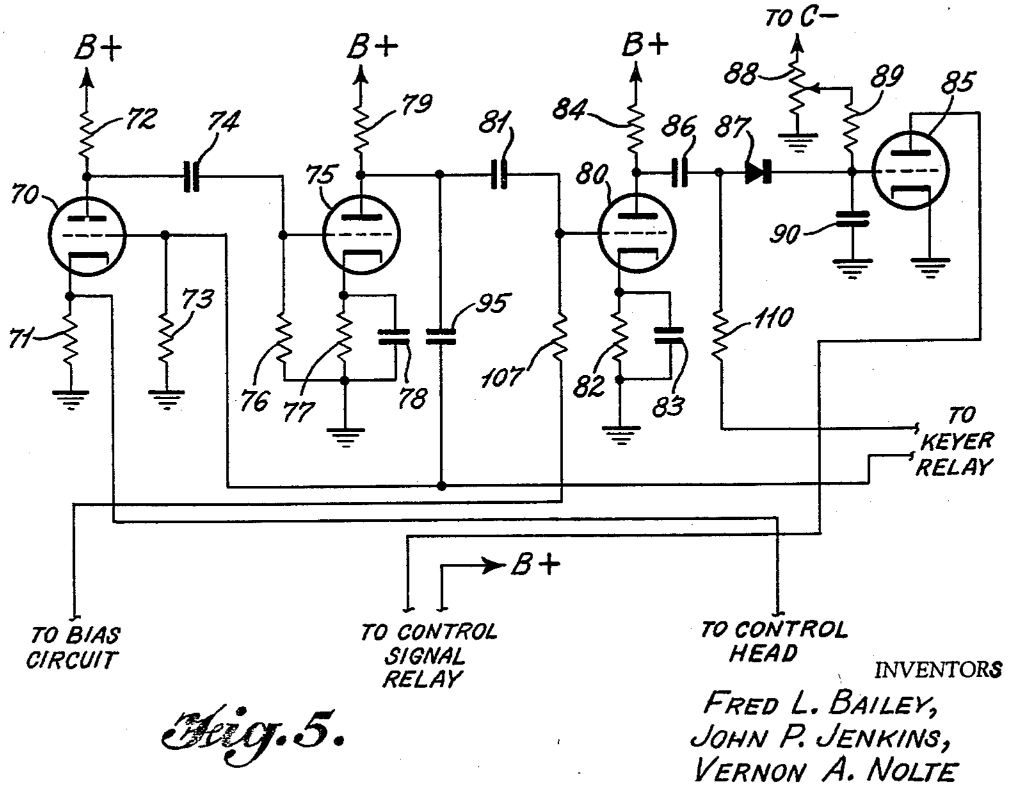
FIG. 5 is a schematic diagram of the control signal amplifier and generator of FIG. 4.

In operation of the circuit described in FIGS. 4 and 5, when a program of any appropriate type is to be recorded, the power switch 22 is closed and the tape cartridge 17 placed in operative position to close cartridge switch 40.

Then, the "Ready" indicator 20 is energized through the contacts 49 and 45 of control relay 34, stop switch 24, and contacts 46 and 47 of the control signal relay. The operator may then depress record "Set" switch 28 to energize the record relay 58 and transfer relay 51. At this time, the "Record" indicator 27 which is connected across the record relay will energize. The program head 4 will then be connected through the contacts of transfer relay 51 to recording amplifier 55. The operator will then depress start switch 23 to energize the start relay 38 and the control relay 34. The charge on capacitors 105 and 106 of the bias circuit 103 will then be dissipated through the operating coil of keyer relay 97 to energize that relay and lift the ground connection from the control grid of tube 70. The circuit including tubes 70 and 75 will at this time be operative as a generator to provide a control signal tone to the control head 4. Simultaneously, any audio signal connected to recording amplifier 55 will be recorded on the program channel of the tape through program head 4.

At the end of a very short time period determined by the characteristics of keyer relay 97 and bias circuit 103, the keyer relay will deenergize to reestablish the ground on the grid of tube 70 and to convert the circuit 65 to an amplifier. The program head will continue to record the audio input supplied to recording amplifier 55 until the end of the program, whose length is of course set by the length of the continuous tape 1. After the program is completed, the apparatus will continue to operate to advance the tape past the program head 4 and control head 5 until the area of the tape upon which the control signal was recorded reaches the control head. The voltage then developed by the control head will be amplified in the amplifier 65 and supplied as a positive D.C. voltage to the grid of tube 85. This positive voltage will cut on the relay tube and provide an energizing current for control signal relay 48. Since the control relay 34, the transfer relay 51, and the record relay 58 all have their holding circuits completed through the normally engaged contacts 46 and 47 of the control signal relay, energization of that relay interrupts the energizing circuits for these other relays and returns them to deenergized condition. The rotary solenoid 9 is then deenergized to stop movement of the tape and the tape is now in proper position for playback.

The cartridge may now be removed from the apparatus and stored for later use. When its program is to be reproduced, for instance, for broadcasting purposes, the tape is returned to operative position to close cartridge switch 40. The start button 23 is then depressed and, since the record relay and transfer relay are then deenergized, the program head is connected to the program amplifier 53 and the recorded program is available at the output of the amplifier. At the beginning of the reproduction of the program, the control signal on the tape is opposite control head 5, but that signal has no effect at this time, because of the negative bias on tube 80 provided by bias circuit 103 and on tube 85 provided by voltage divider potentiometer 88. By the time that the cut-off bias provided by circuit 103 has leaked off, so that the tube 80 is able to amplify signals, the area of the tape carrying the control signal has passed the control head 5. Tape drive continues, accompanied by reproduction of the recorded program to the end of the program and beyond, until the control signal again is detected by the control head 5. The amplified control signal is operative as before to energize the control signal relay, stop tape drive, and return all relays to deenergized condition.

The apparatus of FIGS. 4 and 5 employs a solenoid for tape drive. It also employs a single circuit for both control signal amplification and generation. The apparatus specifically shown in FIG. 5, that is, the combined amplifier and generator for supplying a tone signal to the control head and alternatively for actuating a relay in response to detection of such a signal by the control head, is actually not the invention of the present applicants, but rather is the invention of William E. Moulic, Jr. That invention is described and claimed in a separate patent application. The apparatus now to be described in conjunction with FIGS. 6 and 7 employs a positioning motor for motion of the pinch roller 8 (FIG. 1) toward and away from the drive capstan 6. It also employs a control signal amplifier separate from the control signal generator.

The apparatus of FIG. 6 includes a console 120 having a top panel 121 provided with a plate 122 against which one side of the cartridge is to be positioned. The recording and pickup heads are mounted in a box 123 in a position such that the exposed portions of the tape are adjacent the heads when the cartridge is in proper position. Beneath the cartridge and exposed through the top of panel 121 is a cartridge switch 124 (shown only in FIG. 7), which is adapted to be closed by the cartridge when it is in appropriate position.

The front panel 125 of the console carries the various indicators and control switches, now to be described. The "Power" switch 126 is shown at the lower left side of the front panel, while the "Start" switch 127 is shown at the right. The "Stop" and "Reset" switch 128 is immediately above the "Start" switch, while the "Record Set" switch 129 is to the left. The panel is provided with four indicators arranged in two columns, with the left indicators corresponding to the recording condition of the equipment, and the right indicators corresponding to the play condition, as indicated by the legends above these indicators. The top indicators 130 ("Record Ready") and 131 ("Play Ready") indicate when the equipment is ready for recording and for playback, respectively, while the bottom indicators 132 ("Record Run") and 133 ("Play Run") indicate when the equipment is running during recording, and playback, respectively.

The apparatus shown in FIG. 6 contains an audio amplifier for the program to be recorded upon the magnetic tape. That amplifier is controlled by the "Gain" control 135 and the audio output is indicated by "VU" meter 136.

Figure 7:
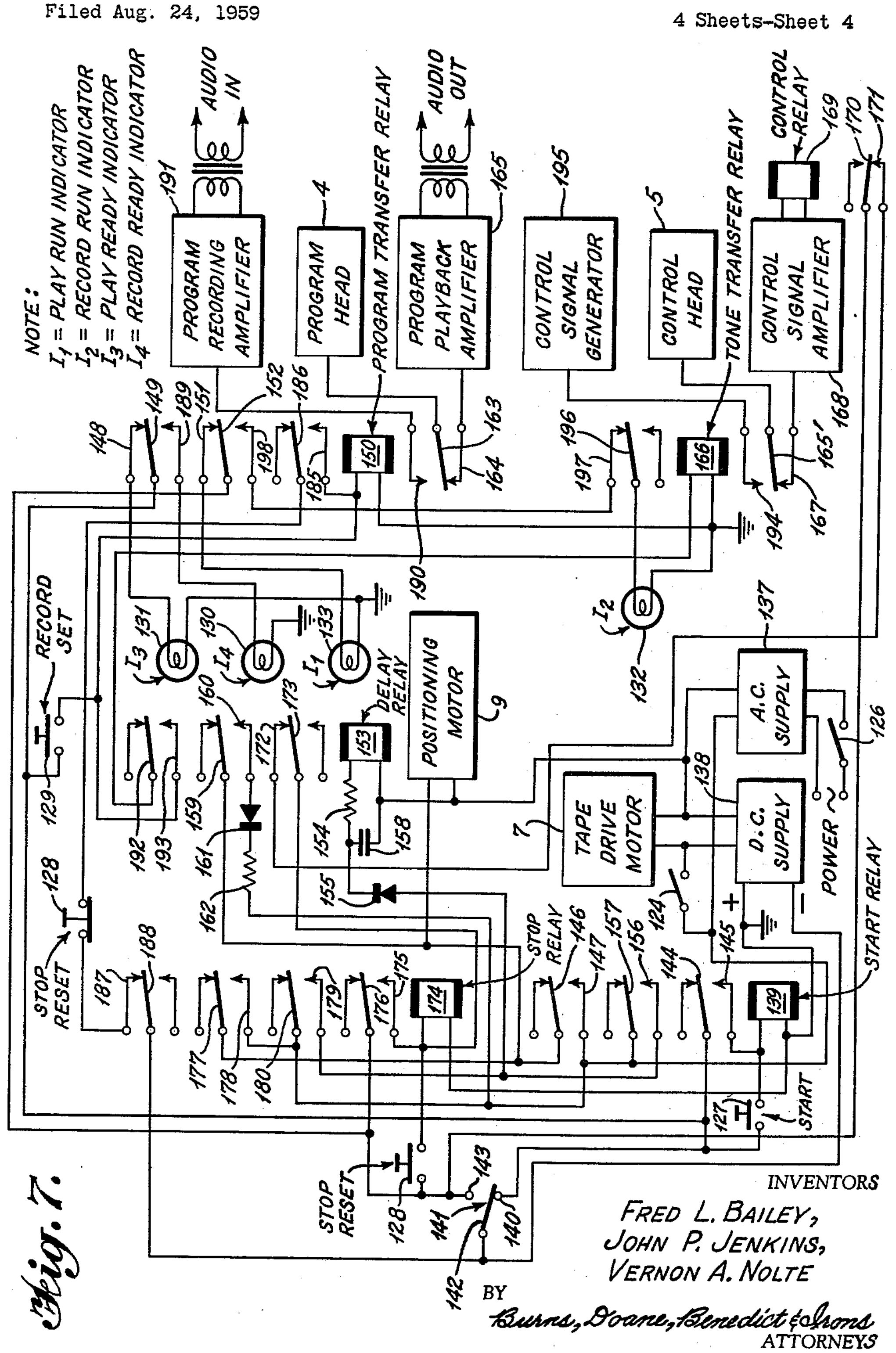
FIG. 7 is a schematic diagram of the electrical components of the apparatus of FIG. 6.

Referring now to FIG. 7, power is supplied to the equipment from the usual A.C. mains to an A.C. voltage supply 137, under the control of "Power" switch 126. The tape drive motor 7 (FIG. 1) is supplied with voltage from the A.C. supply through the cartridge switch 124, so that the capstan 6 of FIG. 1 is driven continuously from the moment the cartridge is placed in appropriate position.

The apparatus is also provided with a D.C. supply 138 which receives its energizing potential from the A.C. supply 137 through the cartridge switch 124.

The "Start" switch 127 is connected to one side of the operating coil of a start relay 139, while the other side of the coil is connected to the grounded positive side of the D.C. supply. The other terminal of the "Start" switch is connected to one stationary contact 140 of a limit switch 141 controlled by the positioning motor 9. As indicated in FIG. 1, the positioning motor controls a shaft 10 which carries the pinch roll 8. The shaft 10 also carries an actuator which controls the position of the movable contact 142 of the limit switch 141. When the shaft is in the position shown in FIG. 1, with the pinch roll out of contact with the tape, so that the tape is not being driven, the movable contact engages fixed contact 140. On the other hand, when the pinch roll is in operative position, the movable contact engages a fixed contact 143. The movable contact 142 is connected to the negative side of the D.C. supply 138, so that, when operation of the equipment is first begun, and the start switch 127 is depressed, the start relay 139 is energized. The "Start" switch is of the customary momentary-contact push-button type, so that the start relay is provided with a holding circuit connected across the "Start" switch and comprising movable contact 144 and stationary contact 145 of the relay.

The positioning motor 9 has one of its sides connected to one side of the A.C. supply 137 and its other side connected to a movable contact 146 of the start relay. The corresponding stationary contact 147 which is engaged when the relay is energized is connected to the other side of the A.C. supply. Therefore, when the start switch is depressed, operating voltage is supplied to the positioning motor and it rotates shaft 10 (FIG. 1) to move pinch roll 8 into operative position. Tape drive then begins. The "Play Ready" indicator 131 has one of its terminals connected to ground and its other terminal connected through normally closed contacts 148 and 149 of a program transfer relay 150 to contact 140 of the limit switch 141. Therefore, before the "Start" switch is depressed, the "Play Ready" indicator is operated.

When the positioning motor has completed its movement to cause engagement of the pinch roll with the tape and begin tape drive, the movable contact 142 of the limit switch is moved into engagement with stationary contact 143. At this time, the holding circuit for start relay 139 is interrupted, so that the start relay deenergizes. Simultaneously, the "Play Run" indicator 133 is energized, since one of its terminals is connected to ground and its other terminal is connected through normally-closed contacts 151 and 152 of program transfer relay 150 to stationary contact 143 of the limit switch 141. Operation of these indicators of course presumes that the program transfer relay is not energized. That relay is only energized when the "Record Set" switch 129 is depressed, since one side of the operating coil of the program transfer relay is connected to ground but the other side is connected through the normally open contacts of the "Record Set" switch to stationary contact 140 of the limit switch. The operations during energization of the program transfer relay will be described hereinafter.

As indicated hereinabove, when the positioning motor 9 has moved the pinch roll 8 into engagement with the tape, the limit switch 141 changes condition and the start relay 139 deenergizes. At this time, a delay relay 153 causes positive braking to be applied to the positioning motor in order to prevent it from rotating the shaft 10 out of the proper position. The delay relay has one side of its operating coil connected to one terminal of A.C. supply 137 and the other side connected through a resistor 154 and diode rectifier 155 to stationary contact 156 of the start relay. The corresponding movable contact 157 of the start relay is connected to the other terminal of the A.C. supply, so that, when the start relay was energized, operating voltage was supplied to the delay relay. Of course this energizing circuit is completed through the normally open contacts 156 and 157 of the start relay so that the relay would deenergize upon deenergization of the start relay if it were not for the provision of a capacitor 158 connected across the series combination of the operating coil of the delay relay and resistor 154. This capacitor charges up during energization of the start relay and discharges after deenergization thereof to maintain the delay relay energized for a short period thereafter. One of the movable contacts 159 of the delay relay is connected directly to the same terminal of the positioning motor 9 which is connected to movable contact 146 of the start relay. The corresponding stationary contact 160 is connected through a diode rectifier 161 and a resistor 162 to the stationary contact 147 of the start relay which cooperates with movable contact 146 thereof. As a result, when the start relay is energized a short is placed across the series circuit including rectifier 161 and resistor 162, but when the start relay is deenergized, this short is removed and the A.C. positioning motor receives voltage through the resistor and rectifier. This voltage, being rectified, operates to dynamically brake the positioning motor and stop rotation of shaft 10.

The program head 4 which cooperates with the record tape 1 (FIG. 1) is connected to a movable contact 163 of the program transfer relay 150. When the relay is deenergized, that movable contact engages a stationary contact 164 which is connected to the input of a program playback amplifier 165. This playback amplifier is of conventional design and supplies an audio output voltage when may be employed for any appropriate purpose, such as audio program broadcasting. The control head 5 is connected to the movable contact 165' of a tone transfer relay 166, while the corresponding normally-engaged stationary contact 167 is connected to the input of a control signal amplifier 168. The control signal amplifier is of conventional design and operates normally to energize the control relay, but, when the control head 5 detects a control signal on the tape, the relay 169 is deenergized. The control relay has a movable contact 170 which engages a stationary contact 171 when the relay is deenergized. The movable contact is connected to the fixed contact 143 of limit switch 141, so, that when the tape is being driven, negative D.C. voltage is supplied to the movable contact 170. The stationary contact 171 is connected to a stationary contact 172 of the delay relay 153. Stationary contact 172 is normally engaged with movable contact 173 which is connected to one side of the operating coil of a stop relay 174. The other side of the stop relay coil is connected to ground, so that, when the tape is being driven and the control head detects a control signal, the stop relay is energized.

When the apparatus is ready for playback, the area of the tape carrying the recorded control signal is opposite the control head. Provision must therefore be made for preventing the control signal from stopping record drive immediately after it is begun. This feature is taken care of by the inclusion of delay relay contacts 172 and 173 in the energizing circuit for the stop relay 174. At the beginning of playback, the delay relay is energized so that the energizing circuit for the stop relay is open and cannot be completed until the delay relay 153 is deenergized. The holding time of this relay is long enough so that the recorded control signal will have passed the control head by the time the relay is deenergized. Thereby, tape drive is automatically stopped only after playback of the recorded information.

The stop relay has a holding circuit including a stationary contact 175 connected to the ungrounded side of its operating coil and a movable contact 176 which is engaged by the stationary contact when the relay energizes. The movable contact 176 is connected to the stationary contact 143 of the limit switch 141, thereby shunting the control relay contacts when the stop relay is energized.

The positioning motor 9 has one of its terminals connected to a movable contact 177 of the stop relay, while the corresponding normally-disengaged stationary contact 178 is connected to one side of the A.C. supply 137. Therefore, when the stop relay is energized, the positioning motor is supplied with operating voltage and begins rotation to move the pinch roll 8 (FIG. 1) away from the drive capstan 6. The delay relay 153 has its associated rectifier connected to contacts of the stop relay, as well as to contacts of the start relay. The rectifier 155 is connected to the normally-disengaged stationary contact 179 which is engaged by movable contact 180 when the stop relay is energized. Movable contact 180 is connected to the A.C. supply 137 so that the delay relay is energized and the capacitor 158 across its operating coil begins to charge when the stop relay is energized.

When the positioning motor 9 moves the pinch roll 8 to its inoperative position, the movable contact 142 of limit switch 141 is moved into engagement with stationary contact 140. The stop relay 174 is then deenergized, since its holding circuit was completed through contacts 143 and 142 of the limit switch. However, the capacitor 158 discharges through the delay relay coil at this time to keep the delay relay energized for a short period. The positioning motor is then provided with dynamic braking current through the contacts 159 and 160 of the delay relay, as described above. The positioning motor therefore stops operation substantially immediately and the delay relay releases to prepare the circuit for a new cycle of operations.

The cycle described above was the playback cycle of the apparatus. In order that a signal may be recorded on the magnetic tape, the operator depresses the "Record Set" switch 129 before depressing the "Start" switch 127. One terminal of the "Record Set" switch is connected to the contact 140 of the limit switch 141 and therefore to the negative side of the D.C. supply, before tape drive is begun. The other side of the "Record Set" switch is connected to one terminal of the operating coil of program transfer relay 150. The other side of the operating coil is connected to ground, so that the program transfer relay is energized when the "Record Set" switch is depressed.

The program transfer relay is provided with a holding circuit including stationary contact 185 which is connected to the ungrounded side of the operating coil and movable contact 186 which is connected through normally-closed contacts of the "Stop" and "Reset" switch 128 to a stationary contact 187 of the stop relay 174. Contact 187 is normally engaged by movable contact 188 which is connected to the negative side of the D.C. supply. The program transfer relay is therefore provided with a bypass circuit around the "Record Set" switch. This bypass circuit is interrupted only when the "Stop" and "Reset" switch 128 is operated or the stop relay 174 is energized.

When the program transfer relay is energized, the "Record Ready" indicator 130 is operated. One side of this indicator is connected to ground while the other side is connected to a stationary contact 189 of the program transfer relay. When that relay is energized, contact 189 is engaged by movable contact 149 which, as described above, is connected to stationary contact 140 of the limit switch 141.

The movable contact 163 of the program transfer relay, which is connected to the program head 4, engages a stationary contact 190 when the relay is energized. The stationary contact is connected to a program recording amplifier 191, so that the audio input voltage supplied to the program recording amplifier is recorded on the tape by the program head 4 when the transfer relay is energized.

When the "Record Ready" indicator 130 indicates that the apparatus is ready for recording, the operator depresses the "Start" button 127, which, as described above, causes the start relay 139 to be energized. Operation of the start relay, as also described above, causes the delay relay 153 to be energized. The delay relay has a movable contact 192 which is connected to one terminal of the operating coil of the tone transfer relay 166. The contact 192 engages a stationary contact 193 when the delay relay is energized, and that stationary contact is connected to the junction between the coil of the program transfer relay and its holding circuit contact 185. Therefore, when the program transfer and delay relays are energized, the tone transfer relay is also energized. As indicated above, the control head 5 is connected to a movable contact 165' of the tone transfer relay. That contact engages a stationary contact 194 when the tone transfer relay is energized. The contact 194 is connected to the output of a control signal generator 195 which is of appropriate conventional design to provide the control head with a control signal.

From the above description, it will be remembered that the positioning motor 9 moves the pinch roll 8 into operative position such that the tape is driven by the drive capstan 6, after the start relay 139 is energized. The start relay then deenergizes by reason of reversal of the position of limit switch 141, but the delay relay remains energized for a short time. During this interval, the tape is running and, since the tone transfer relay 166 is energized, the control signal generator 195 supplies the control head 5 with a control signal. The delay relay then deenergizes and the control signal generator is disconnected from the control head by deenergization of the tone transfer relay. The program transfer relay, however, remains energized so that the program from the recording amplifier 191 is recorded on the tape by the program head 4. The "Record Run" indicator 132 then energizes to indicate that the recording operation is proceeding. One side of that indicator is connected to ground, and the other side is connected to the positive side of D.C. supply 138 through contacts 196 and 197 of tone transfer relay 166, contacts 198 and 152 of program transfer relay 150, and contacts 143 and 142 of limit switch 141.

The tape continues to run until the control signal that was recorded in the beginning of the program is detected by the control head 5. Then, the control signal amplifier deenergizes the control relay 169 and the stop relay 174 is energized to cause the positioning motor to move the pinch roll away from its operative position. Tape drive then stops and the various relays are deenergized.

The stop relay 174 can also be operated by the "Stop" and "Reset" button 128. This button is not normally employed but is useful in case something goes wrong with the apparatus shown or with any auxiliary apparatus during the recording process. One side of the normally open contacts of the "Stop and "Reset" switch is connected to one side of the operating coil of the stop relay, while the other side is connected to contact 143 of the limit switch 141. Therefore, when the tape is being driven, the stop relay may be energized by depressing the "Stop" and "Reset" switch to energize the positioning motor and stop the tape drive. Of course, if this is done, the tape position will not be appropriate for playback of the beginning of the program which has been recorded, but rather playback must again be initiated so that the tape can move to the position where the control signal was recorded. The control signal, of course, will then again energize the stop relay and tape drive will stop at the beginning of the recorded program. It will be noted that two sets of contacts of the "Stop" and "Reset" switch are shown on the drawing, one set being for control of the stop relay and the other set for control of program transfer relay 150.

Since the operation of the embodiment of the apparatus described in conjunction with FIGS. 6 and 7 has been described during description of the apparatus, and since it is quite similar to the operation of the apparatus of FIGS. 4 and 5, the operation of the latter embodiment will be apparent without further explanation.

It will be apparent that many minor changes could be made in the preferred embodiment described in conjunction with the drawings.

Therefore, the invention is not to be considered limited to the specific embodiments described, but rather only the scope of the appended claims.

We claim:

1. Transduction apparatus for a continuous loop magnetic tape having a program signal thereon and a relatively short control signal thereon coincident in playback time with the beginning of such program, comprising a program signal transmission channel selectively responsive to a tape derived program signal, a control signal transmission channel selectively responsive to a tape derived control signal, unidirectional tape drive means for driving a tape for transduction, start switch means operative to initiate continued tape drive responsively to momentary switch closure, first control means for the tape drive means immediately operative responsively to a control signal from the control signal channel to terminate tape drive, and second control means nonrecurrently operative after operation of the start switch to prevent any operation of the first control means in response to a first transmission of a control signal initiated on operation of the start switch.

2. The reproducer of claim 1 wherein the second control means comprises time delay means responsive to momentary closure of the start switch means operative a predetermined interval longer than said control signal thereafter to initiate operation of the control signal transmission channel.

3. The reproducer of claim 1 further including first recording means operative to record a program signal, second recording means operative to record a control signal of predetermined relatively short time duration, and first recording control means simultaneously operative to initiate recording by both recording means synchronously with tape drive initiation.

4. The reproducer of claim 1 further including first recording means operative to record a program signal, second recording means operative to record a control signal of predetermined relatively short time duration, first recording control means simultaneously operative to initiate recording by both recording means synchronously with tape drive initiation, and second recording control means immediately operative to terminate operation of the first recording means responsively to reproduction of the control signal recorded by the second recording means by the control signal transmission channel and to preset the program signal transmission channel for reproduction.

5. In a tape reproducer, first and second reproduce heads in offset lateral relationship, unidirectional tape drive means operative to move past the heads a continuous loop magnetic tape carrying a program signal record adjacent the first head and a control signal record adjacent the second head, said drive means comprising a capstan element and a pinch roll element, said elements being relatively movable toward each other to engage and drive the tape and away from each other to release the tape to stop drive, start means to initiate continued tape drive responsively to momentary actuation, first control means for the tape drive means immediately operative responsively to a signal from the second head to terminate tape drive; and second control means nonrecurrently operative after operation of the start means to prevent any operation of the first control means in response to a control signal initiated snychronously with operation of the start means, whereby a leading control signal generated in synchronism with initiation of a program signal will stop tape drive only on a succeeding passage adjacent the control read to position the tape in program record initiation position relative to the first reproduce head.

6. Recording apparatus for a continuous loop magnetic tape comprising unidirectional tape drive means for driving a tape for recording, first recording means operative to record a program signal, second recording means operative to record a control signal of predetermined relatively short time duration, and recording control means simultaneously operative to initiate recording by both recording means synchronously with tape drive initiation and operative thereafter to continue tape drive independently of termination of the control signal.

7. The recording apparatus of claim 6 further including means immediately operative to stop tape drive responsively to return of the recorded control signal to the second recording means.

8. Recording and reproducing apparatus for a continuous loop magnetic tape comprising unidirectional tape drive means for driving a tape for transduction, first tape transducing means operative to record and reproduce a program signal, second tape transducing means operative to record and reproduce a control signal of predetermined relatively short duration, first transducing control means simultaneously operative to initiate recording by both transducing means synchronously with tape drive initiation, and second transducing control means immediately operative to terminate the recording operation of the first transducing means responsively to initial reproduction of the recorded control signal.

9. Reproducing apparatus for a continuous loop magnetic tape having information recorded on one channel and a control signal recorded on a parallel channel coincident in playback time with the beginning of such information comprising a playback head and a control head cooperable with said one and said parallel channels, respectively, transducing means connected to said playback head, a control signal amplifier connected to said control head to amplify its output, a continuously driven drive capstan, a pinch roll spring-urged to a position remote from said capstan but rotatable to an operative position adjacent said capstan, said pinch roll being operable when in its operative position and when a tape is in proper position on said reproducing apparatus to frictionally engage the tape with said capstan so as to cause the tape to move across said playback and control heads, a solenoid operable when energized to rotate said pinch roll to its operative position, a voltage source, a control relay, means including contacts of said control relay which are engaged only when the relay is energized for connecting said solenoid to said voltage source to energize it, means including a momentary contact switch operable when the switch is closed to energize the control relay to start tape drive, a control signal relay connected to the output of said control signal amplifier to be energized when the control head detects a control signal except during a period immediately following beginning of playback corresponding to the length of the control signal, and a holding circuit for said control relay including contacts of said control signal relay which are engaged only when the relay is de-energized, said holding circuit being operable when complete to maintain said control relay energized, whereby detection of the control signal following completion of playback of the information on the tape causes de-energization of the control relay and movement of the pinch roll away from the capstan to stop tape drive at the beginning of the recorded information.

10. Recording and reproducing apparatus for continuous loop magnetic tape having at least a pair of parallel channels comprising a record-playback head and a control head cooperable with one and the other of said channels, respectively, recording and reproducing means connected to said record-playback head operable alternately to record information on and reproduce information from said one channel, control signal generating and amplifying means operable alternately to provide said control head with a control signal of duration short as compared with said information and to amplify said control signal, switch means operable responsively to momentary switch closure to shift said recording and reproducing means and the signal generating and amplifying means to disconnect said record-playback head from said reproducing means and to connect it to said recording means and operable to shift said control signal generating and amplifying means to cause a control signal to be recorded on the tape at the beginning of recording of said information, unidirectional drive means for driving the tape with respect to said control and record-playback heads comprising a capstan element and a pinch roll element, said elements being relatively movable toward each other to engage and drive the tape and away from each other to release the tape to stop tape drive, means connected to the output of said amplifying means immediately operable to stop tape drive when a control signal is detected by said control head, and means for preventing operation of said disabling means for an interval corresponding to the duration of the control signal after driving of the tape is begun.

11. The apparatus of claim 10 in which said shift means includes first and second relay means and a record switch, said first relay means being operable when energized to connect said record-playback head to said recording means and when de-energized to connect the record-playback head to said transducing means, a holding circuit for said first relay means operable to maintain it energized when said switch is released, said disabling means including third relay means controlled by the output of said amplifying means and having contacts forming part of said holding circuit, so that said first relay means is de-energized when a control signal is detected by said control head, said second relay means being operable when energized to cause said control signal generating and amplifying means to supply a control signal to said control head, and means operable to energize said second relay means for a short time when recording is begun.

12. Reproducing apparatus for a continuous loop magnetic tape having information recorded on one channel and a control signal recorded on a parallel channel coincident in playback time with the beginning of such information comprising a playback head and a control head cooperable with said one and said parallel channels, respectively, transducing means connected to said playback head, a control signal amplifier connected to said control head to amplify its output, a control relay connected to the output of said control signal amplifier, a continuously-rotating unidirectional drive capstan, a pinch roll movable from a position remote from said capstan to an operative position adjacent said capstan and operable when in its operative position to hold the tape in engagement with the capstan to cause tape movement, electric motor means operable when energized to move said pinch roll from the position it was in prior to such energization to the other position, a source of energizing voltage, a start relay, a start switch, a stop relay, a delay relay including a storage capacitor connected across its relay winding, a limit switch having a movable contact and a pair of fixed contacts, said movable contact being movable with said pinch roll into engagement with the first one of said fixed contacts when said pinch roll moves to its remote position and into engagement with the second contact when the pinch roll moves to its operative position, an energizing circuit for said start relay including said start switch and the first and movable contacts of said limit switch operable to energize the start relay when the start switch is momentarily closed and to keep it energized until said movable contact of the limit switch moves away from said first contact, means including first contacts of said start relay which are engaged only when the relay is energized to connect said electric motor means to said voltage source, an energizing circuit for said delay relay including second contacts of said start relay which are engaged only when the relay is energized; an energizing circuit for said stop relay including contacts of said delay relay which are engaged only when the relay is de-energized, contacts of said control relay which are engaged only when a control signal is detected by said control head, and the second and movable contacts of said limit switch; and means including first contacts of said stop relay which are engaged only when the relay is energized to connect said electric motor means to said voltage source, whereby the motor means is energized to move the pinch roll to operative position to start tape drive when the start switch is closed, whereupon the motor stops, and the motor means is again energized to move the pinch roll to its remote position to stop tape drive when the control head detects a control signal upon completion of playback of said information.

13. The apparatus of claim 12 in which said motor means includes an A.C. positioning motor and said voltage source supplies A.C. voltage thereto, and including a series resistor-rectifier combination connected in series between said voltage source and said positioning motor when said delay relay is energized, said first contacts of said start and stop relays being connected across said combination to short it when either relay is energized, a second energizing circuit for said delay relay including second contacts of said stop relay which are engaged only when the relay is energized, said storage capacitor being operable to maintain said delay relay energized for a short time following de-energization of either of said start and stop relays, whereby dynamic braking is applied to said positioning motor to stop it immediately upon de-energization of either said start or stop relay.

14. Recording and reproducing apparatus for continuous loop magnetic tape having at least a pair of parallel channels comprising a record-playback head and a control head cooperable with one and the other of said channels, respectively, recording and transducing means, a program transfer relay operable when de-energized to connect said record-playback head to said transducing means and operable when energized to connect the head to said recording means, so that information may alternately be recorded on and reproduced from said one channel, control signal generating and control signal amplifying means, a tone transfer relay operable when de-energized to connect said control head to said control signal amplifying means and operable when energized to connect the head to said control signal generating means, so that a control signal may be alternately recorded on and reproduced from said other channel, a continuously-rotating unidirectional drive capstan, a pinch roll movable from a position remote from said capstan to an operative position adjacent said capstan and operable when in its operative position to hold the tape in engagement with the capstan to cause tape movement, means including an A.C. positioning motor operable when energized to move said pinch roll from the position it was in prior to such energization to the other position, a source of A.C. energizing voltage, a start relay, a start switch, a stop relay, a delay relay including a storage capacitor connected across its relay winding to maintain the relay energized for a period short compared with the length of said information after the energizing circuit for the relay is opened, a limit switch having a movable contact and a pair of fixed contacts, said movable contact being movable with said pinch roll into engagement with the first one of said fixed contacts when said pinch roll moves to its remote position and into engagement with the second contact when the pinch roll moves to its operative position, an energizing circuit for said start relay including said start switch and the first and movable contacts of said limit switch operable to energize the start relay when the start switch is momentarily closed and to keep it energized until said movable contact of the limit switch moves away from said first contact, means including, in shunt, first contacts of said start relay and first contacts of said stop relay which are engaged only when the respective relay is energized to connect said positioning motor to said voltage source, a control relay connected to the output of said control signal amplifier; an energizing circuit for said stop relay including contacts of said delay relay which are engaged only when the relay is de-energized, contacts of the control relay which are engaged only when a control signal is detected by said control head, and the second and movable contacts of said limit switch, and a holding circuit for said stop relay shunting the delay and control relay contacts so that the start relay once energized is maintained energized until the pinch roll moves from its operative to its remote position; an energizing circuit for said delay relay including, in shunt, second contacts of said start relay and second contacts of said stop relay which are engaged only when the respective relay is energized, a record set switch; an energizing circuit for said program transfer relay including said record set switch and the first and movable contacts of said limit switch, and a holding circuit for said program transfer relay shunting the record set switch and the limit switch but including third contacts of said stop relay which are engaged only when the stop relay is de-energized, whereby the program transfer relay once energized remains energized until the stop relay is energized upon detection of a control signal by said control head; and an energizing circuit for said tone transfer relay connecting the winding thereof across the winding of the program transfer relay through contacts of the delay relay which are engaged only when that relay is energized; whereby, during recording, a control signal is recorded on said other channel for a period extending from the start of tape drive until de-energization of the delay relay, whereupon the tone transfer relay de-energizes to connect the control head to the control signal amplifier and tape drive is halted when the control head next detects a control signal.

15. Reproducing apparatus for a continuous loop magnetic tape having information recorded on one channel and a control signal recorded on a parallel channel coincident in playback time with the beginning of such information comprising a playback head and a control head cooperable with said one and said parallel channels, respectively, a control signal amplifier connected to said control head to amplify its output, a continuously driven drive capstan, a pinch roll having at least an operative and an inoperative position and operable only when in its operative position and when a tape is in proper position on said reproducing apparatus to frictionally engage the tape with said capstan so as to cause the tape to move across said playback and control heads, a solenoid operable when energized to move said pinch roll to its operative position, a voltage source, a control relay, means including contacts of said control relay which are engaged only when the relay is energized for connecting said solenoid to said voltage source to energize it, means including a momentary contact switch operable when the switch is closed to energize the control relay and to start tape drive, a control signal relay connected to the output of said control signal amplifier to be energized when the control head detects a control signal, a holding circuit for said control relay including contacts of said control signal relay which are engaged only when the relay is deenergized, said holding circuit being operable when complete to maintain said control relay energized, and means for preventing de-energization of said control relay for a short time following the initiation of tape drive sufficient to enable the portion of tape carrying the control signal to pass the control head.

References Cited in the file of this patent

UNITED STATES PATENTS

| | | |
|---|---|---|
| 2,514,578 | Heller et al. | July 11, 1950 |
| 2,558,853 | Kappeler | July 3, 1951 |
| 2,571,973 | Walker | Oct. 16, 1951 |
| 2,604,547 | Sack | July 22, 1952 |
| 2,615,989 | Thad | Oct. 28, 1952 |
| 2,787,669 | Flam et al. | Apr. 7, 1957 |
| 2,819,940 | Sorrells | Jan. 14, 1958 |
| 2,995,630 | Kabrick | Aug. 8, 1961 |